United States Patent … US 9,394,825 B2
Dziubinschi et al. … Jul. 19, 2016

(54) CHARGE AIR COOLER INTERNAL CONDENSATION SEPARATOR

(71) Applicant: Halla Visteon Climate Control Corp., Daejeon (KR)

(72) Inventors: Orest Alexandru Dziubinschi, Dearborn, MI (US); Kastriot Shaska, Northville, MI (US); Brian James Cardwell, Ypsilanti, MI (US)

(73) Assignee: Hanon Systems, Daejeon-si (KR)

(*) Notice: Subject to any disclaimer, the term of this patent is extended or adjusted under 35 U.S.C. 154(b) by 19 days.

(21) Appl. No.: 14/246,342

(22) Filed: Apr. 7, 2014

(65) Prior Publication Data

US 2015/0285129 A1   Oct. 8, 2015

(51) Int. Cl.
   F02B 29/04   (2006.01)
   F02M 35/10   (2006.01)
   F02M 35/08   (2006.01)

(52) U.S. Cl.
   CPC .......... *F02B 29/0468* (2013.01); *F02M 35/088* (2013.01); *F02M 35/10262* (2013.01); *Y02T 10/146* (2013.01)

(58) Field of Classification Search
   CPC ................ F02B 29/04; F02B 29/0468; F02M 35/10262; F02M 35/088; Y02T 10/146
   USPC ........................ 60/599; 165/52; 55/426, 427
   See application file for complete search history.

(56) References Cited

U.S. PATENT DOCUMENTS

| 9,109,500 | B2* | 8/2015 | Cockerill | ................ F02B 29/04 |
| 2003/0114978 | A1 | 6/2003 | Rimnac et al. | |
| 2008/0184704 | A1* | 8/2008 | Bock | ....................... B32B 27/12 60/599 |
| 2010/0101234 | A1* | 4/2010 | Birkner | ..................... C09D 1/00 60/806 |
| 2010/0300647 | A1 | 12/2010 | Steurer et al. | |
| 2013/0019845 | A1 | 1/2013 | Meyer | |

FOREIGN PATENT DOCUMENTS

| JP | 52-048719 | 4/1977 |
| JP | 2007229583 A | 9/2007 |
| KR | 10-0495535 B1 | 6/2005 |

\* cited by examiner

*Primary Examiner* — Hoang Nguyen
(74) *Attorney, Agent, or Firm* — Fraser Clemens Martin & Miller LLC; James D. Miller (57) ABSTRACT

A charge air cooler for use with a turbocharged engine system of a motor vehicle includes an outlet tank in fluid communication with a heat exchanger core. A condensation separator comprising an array of baffle plates is disposed adjacent a fluid outlet of the outlet tank. The baffle plates are spaced apart from each other and each of the baffle plates includes an alternating pattern of ridges and grooves formed therein to form a tortuous flow channel between adjacent ones of the baffle plates. The tortuous flow channels cause liquid water originating from the heat exchanger core and flowing through the condensation separator to encounter a surface of the baffle plates before exiting the fluid outlet. The baffle plates may be covered with a surface feature adapted to capture or absorb the liquid water, thereby preventing an undesired quantity of liquid water from entering the engine of the motor vehicle.

18 Claims, 4 Drawing Sheets

CHARGE AIR COOLER INTERNAL CONDENSATION SEPARATOR

FIELD OF THE INVENTION

The invention relates to a charge air cooler, and more specifically to a condensation separator integrated into the charge air cooler to militate against a propagation of liquid water into an engine.

BACKGROUND OF THE INVENTION

Charge air coolers are used to cool a stream of air that has been compressed by a turbocharger. When the air is compressed by the turbocharger, the air is heated and a pressure of the air is increased. However, it is desirable for the air entering the engine to be cooled after exiting the turbocharger because cooler air will have an increased density, thereby improving the efficiency of the engine. The cooling of the air may also eliminate the danger of pre-detonation of the air and a fuel prior to a timed spark ignition.

Most charge air coolers include an inlet tank that distributes the air stream through a plurality of heat exchange tubes. A second cooling fluid flows over the plurality of heat exchange tubes and removes heat from the air flowing therethrough. The air then exits the plurality of heat exchange tubes and enters an outlet tank. The outlet tank includes an outlet through which the air stream exits the charge air cooler before entering an intake region of the engine.

One problem associated with the charge air cooler is that water vapor included within the air stream may be caused to condense within the plurality of heat exchanger tubes when a temperature of the air stream is lowered. The resulting condensation may then flow through the outlet tank and be drawn into cylinders of the engine. The liquid water entering the cylinders of the engine may result in engine misfire and combustion issues that degrade the engine's performance. Additionally, the liquid water entering the cylinders of the engine may be particularly problematic when the motor vehicle having the charge air cooler experiences a sudden increase in the air flow rate through the charge air cooler, such as when the motor vehicle is first started or during other operational conditions. The sudden increase in air flow rate can cause a larger than normal quantity of the liquid water accumulated within the plurality of heat exchanger tubes to surge ahead in the form of a "slug" or "spike," where such surges or spikes are particularly harmful to operation of the engine.

It would therefore be desirable to produce a condensation separator integrated into an outlet tank of a charge air cooler that militates against large quantities of liquid water from exiting the outlet tank.

SUMMARY OF THE INVENTION

Compatible and attuned with the present invention, a condensation separator integrated into a charge air cooler that militates against liquid water from exiting an outlet tank of the charge air cooler has surprisingly been discovered.

In one embodiment of the invention, a condensation separator integrated within an outlet tank of a charge air cooler is disclosed. The condensation separator comprises an array of baffle plates, wherein each of the baffle plates includes a leading edge and a trailing edge in a first direction and the baffle plates are spaced apart from each other. Each of the baffle plates includes at least one corrugation formed therein extending in a second direction transverse to the first direction, the corrugations forming a plurality of flow channels between adjacent ones of the baffle plates.

In a second embodiment of the invention, a charge air cooler for use with a turbocharged engine system of a motor vehicle is disclosed. The charge air cooler comprises an outlet tank in fluid communication with a heat exchanger core. The charge air cooler also comprises an array of baffle plates disposed within the outlet tank, wherein the baffle plates are spaced apart from each other and each of the baffle plates includes an alternating pattern of ridges and grooves formed therein to form a plurality of tortuous flow channels between adjacent ones of the baffle plates.

In yet another embodiment of the invention, a charge air cooler for use with a turbocharged engine system of a motor vehicle is disclosed. The charge air cooler comprises an outlet tank in fluid communication with a heat exchanger core. The charge air cooler further includes a plurality of baffle plates disposed within the outlet tank, wherein a plurality of tortuous flow channels are formed between adjacent ones of the baffle plates. A surface feature is disposed on at least a portion of the plurality of baffle plates, wherein the surface feature is adapted to capture liquid water flowing through the plurality of flow channels. A barrier layer is disposed over at least a portion of the surface feature, wherein the barrier layer is adapted to retain the liquid water within the surface feature.

BRIEF DESCRIPTION OF THE DRAWINGS

The above, as well as other objects and advantages of the invention, will become readily apparent to those skilled in the art from reading the following detailed description of a preferred embodiment of the invention when considered in the light of the accompanying drawings.

DETAILED DESCRIPTION OF THE INVENTION

The following detailed description and appended drawings describe and illustrate various embodiments of the invention. The description and drawings serve to enable one skilled in the art to make and use the invention, and are not intended to limit the scope of the invention in any manner. In respect of the methods disclosed, the steps presented are exemplary in nature, and thus, the order of the steps is not necessary or critical.

Figure 1:
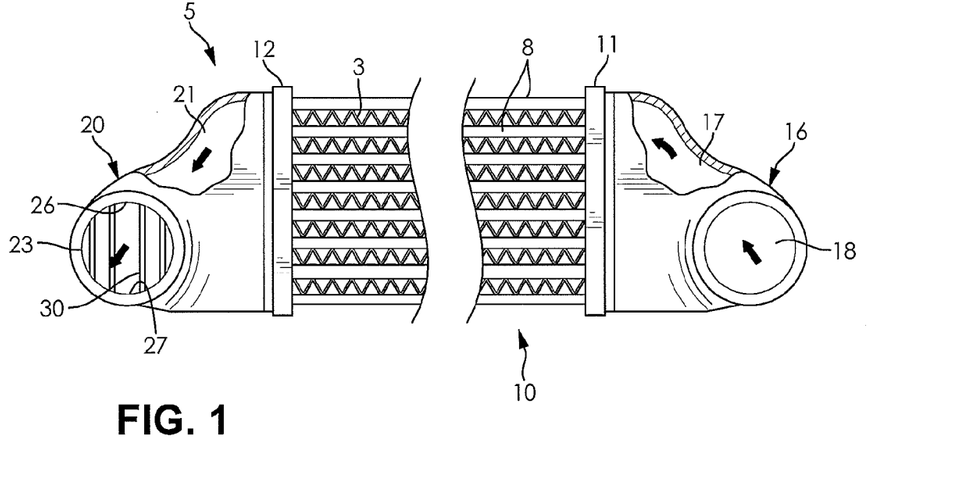
FIG. 1 is a fragmentary front elevational view of a charge air cooler with a portion thereof cut away and having a condensation separator integrated therein according to an embodiment of the invention.

FIG. 1 illustrates a charge air cooler 5 comprising a heat exchanger core 10 disposed between an inlet tank 16 and an outlet tank 20. The inlet tank 16 includes a hollow interior 17 and a fluid inlet 18 providing fluid communication between the hollow interior 17 of the inlet tank 16 and a turbo-charger (not shown) disposed upstream of the inlet tank 16 configured to compress (and hence heat) intake air before the intake air enters the charge air cooler 5. The inlet tank 16 may include at least one fluid outlet (not shown) providing fluid communication between the hollow interior 17 of the inlet tank 16 and a first end plate 11 of the heat exchanger core 10. The first end plate 11 may include a plurality of passages (not shown) formed therein for distributing the charge air to a plurality of heat exchanger tubes 8. A seal or gasket (not shown) may be disposed between the first end plate 11 of the heat exchanger core 10 and the fluid outlet region of the inlet tank 16 to provide a fluid tight seal therebetween.

The plurality of heat exchanger tubes 8 extend from the first end plate 11 to a second end plate 12 disposed at an opposite end of the heat exchanger core 10. In similar fashion to the first end plate 11, the second end plate 12 may also include a plurality of passages (not shown) corresponding to the plurality of heat exchanger tubes 8 for recombining the charge air as it enters the outlet tank 20. The plurality of heat exchanger tubes 8 may be spaced apart to allow a second cooling fluid to flow therebetween. It should be understood that the second cooling fluid may be any fluid having a temperature lower than the intake air flowing through the plurality of heat exchanger tubes. The second cooling fluid may for instance be ambient air, recirculation air, water, or any other cooling fluid circulating through any system of an automobile having the charge air cooler 5. A plurality of fins 3 or other surface area increasing structures may be formed within the heat exchanger tubes 8 on an exterior surface of each of the plurality of heat exchanger tubes 8 to facilitate heat exchange between the charge air flowing through the plurality of heat exchanger tubes 8 and the second cooling fluid flowing between the plurality of heat exchanger tubes 8.

Figure 2:
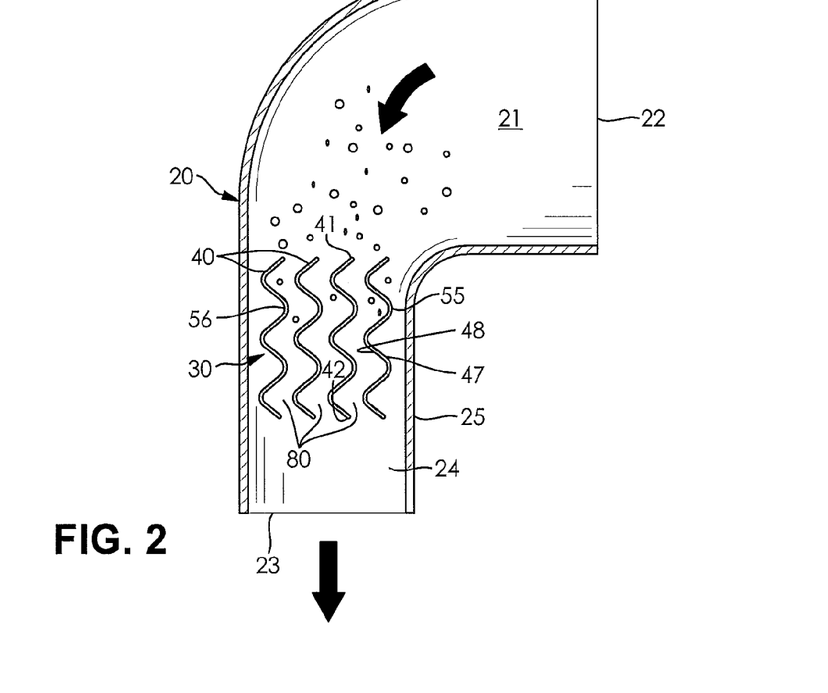
FIG. 2 is a cross-sectional top plan view of an outlet tank having the condensation separator illustrated in FIG. 1.

The outlet tank 20 may include at least one fluid inlet 22 (shown in FIG. 2) formed therein providing fluid communication between the plurality of passages formed in the second end plate 12 of the heat exchanger core 10 and the hollow interior 21 of the outlet tank 20. A seal or gasket (not shown) may be disposed between the second end plate 12 of the heat exchanger core 10 and the fluid inlet 22 of the outlet tank 20 to provide a fluid tight seal therebetween. The outlet tank 20 also includes at least one fluid outlet 23 formed therein providing fluid communication between the hollow interior 21 of the outlet tank 20 and an intake portion of an engine (not shown). The fluid outlet 23 may be formed at an end of an outlet conduit 24 extending from a remainder of the outlet tank 20. As shown in FIG. 2, the outlet conduit 24 and hence the fluid outlet 23 may be arranged in a direction perpendicular to the at least one fluid inlet 22 of the outlet tank 20, causing the charge air flowing through the outlet tank 20 to turn about 90° before exiting through the fluid outlet 23. It should be understood, however, that the outlet conduit 24 may extend from the remainder of the outlet tank 20 in any number of different directions, including in a direction parallel to the direction of air flow into the outlet tank 20, without departing from the scope of the current invention.

As illustrated in FIGS. 1 and 2, a condensation separator 30 may be disposed within the outlet tank 20. The condensation separator 30 may be disposed within the fluid conduit 24 adjacent the fluid outlet 23. However, it should be understood that the condensation separator 30 may be disposed anywhere within the hollow interior 21 of the outlet tank 20 between the fluid inlet 22 and the fluid outlet 23 so long as the charge air flowing through the outlet tank 20 flows through the condensation separator 30. The condensation separator 30 is comprised of an array of baffle plates 40 extending in a direction of air flow through the outlet tank 20.

Figure 3:
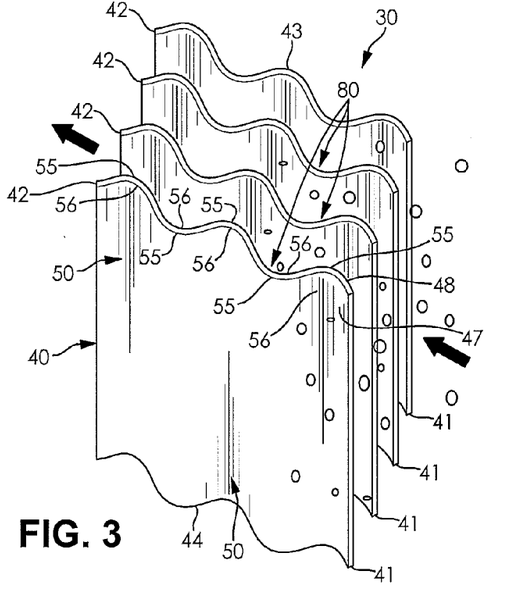
FIG. 3 is a perspective view of an array of baffle plates forming the condensation separator illustrated in FIGS. 1 and 2.
Figure 4:
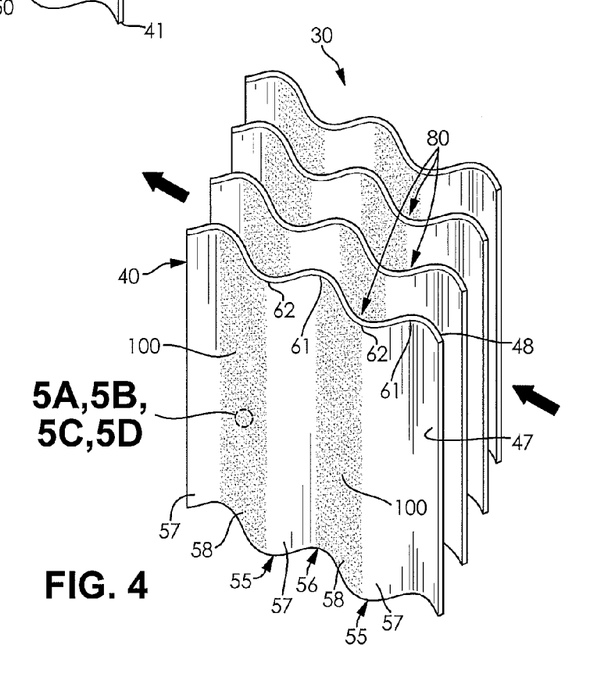
FIG. 4 is a perspective view of the array of baffle plates illustrated in FIG. 3 further including a surface feature formed thereon.

FIGS. 3 and 4 show the array of baffle plates 40 forming the condensation separator 30 removed from the charge air cooler 5 and at a different orientation to better illustrate the structure of each of the baffle plates 40. As shown in FIG. 3, each of the baffle plates 40 includes a leading edge 41 facing the incoming charge air. The leading edge 41 of each baffle plate 40 may face in a direction toward a central region of the hollow interior 21 of the outlet tank 20 or in a direction toward the at least one fluid inlet 22. Each of the baffle plates 40 also includes a trailing edge 42 opposite the leading edge 41. The trailing edge 42 of each baffle plate 40 may face in a direction toward the fluid outlet 23 of the outlet tank 20. Each of the baffle plates 40 further includes a first edge 43 and a second edge 44 opposite thereto. The first edge 43 may abut an upper interior surface 26 of a wall 25 defining the outlet conduit 24 of the outlet tank 20 while the second edge 44 may abut a lower interior surface 27 of the wall 25, as illustrated in FIG. 1. Accordingly, each of the baffle plates 40 spans a cross-section of the outlet conduit 24 in a vertical direction. As shown in FIG. 1, the outlet conduit 24 may be a passage having a circular cross-section, hence a height of each of the baffle plates 40 may vary. However, it should be understood that the outlet conduit 24 and the fluid outlet 23 may have any desired shape and orientation, so long as the condensation separator 30 spans a cross-section of a flow path of the charge air. Furthermore, although it may be desired to align the baffle plates 40 vertically, any orientation of the baffle plates 40 may be suitable. It should also be understood that references to relative terms such as "upper" and "lower" are defined relative the direction of the force of gravity.

Each of the baffle plates 40 further includes a first major surface 47 on one side of each baffle plate 40 and a second major surface 48 on a second opposite side of each baffle plate 40. Each of the first major surface 47 and the second major surface 48 are bounded by the leading edge 41, the trailing edge 42, the first edge 43, and the second edge 44 of each respective baffle plate 40.

Each of the baffle plates 40 has a corrugated shape, including a plurality of corrugations 50 extending from the first edge 43 to the second edge 44 of each of the baffle plates 40. As shown, all of the corrugations 50 of each of the baffle plates 40 are arranged parallel to each other. The corrugations 50 cause each of the first major surface 47 and the second major surface 48 of each baffle plate 40 to have a repeating and alternating pattern of ridges 55 and grooves 56 formed therein, wherein the alternating pattern of ridges 55 and grooves 56 runs from the leading edge 41 of each baffle plate 40 to the trailing edge 42 thereof. The corrugations 50 also cause each of the baffle plates 40 to appear to have a sinusoidal wave profile when viewed from above, as best shown in FIG. 2. It is understood that other configurations can be used as desired such as an offset pattern, for example.

Each ridge 55 formed in the first major surface 47 of each baffle plate 40 corresponds to a groove 56 formed in the second major surface 48 of each baffle plate 40. The alternating pattern of ridges 55 and grooves 56 formed in each baffle plate 40 causes each of the first major surface 47 and the second major surface 48 to also have a repeating and alternating pattern of leading slopes 57 and trailing slopes 58, as best shown in FIG. 4. Each leading slope 57 is a slope forming the alternating ridges 55 and grooves 56 facing in a direction toward the incoming charge air flowing through the outlet tank 20. The leading slopes 57 may face toward the hollow interior 21 of the outlet tank 20 and away from the fluid outlet 23. Each trailing slope 58 is a slope forming the alternating ridges 55 and grooves 56 facing in a direction toward the charge air as the air exits the outlet tank 20 via the fluid outlet 23. Alternatively, each of the leading slopes 57 may be described as extending from a nadir 61 of each groove 56 to a crest 62 of an adjacent ridge 55 formed in one of the baffle plates 40 in a direction running from the leading edge 41 to the trailing edge 42 thereof. Similarly, each of the trailing slopes 58 may be described as extending from a crest 62 of each ridge 55 to a nadir 61 of an adjacent groove 56 formed in one of the baffle plates 40 in a direction running from the leading edge 41 to the trailing edge 42 thereof.

The array of baffle plates 40 forming the condensation separator 30 are all aligned such that the corrugations 50 formed in one of the baffle plates 40 are aligned with the corresponding corrugations 50 formed in each of the other baffle plates 40 forming the array. Accordingly, each of the grooves 56 formed in the first major surface 47 of one of the baffle plates 40 is aligned with and facing a corresponding ridge 55 formed in the second major surface 48 of an adjacent one of the baffle plates 40. Similarly, each of the grooves 56 formed in the second major surface 48 of one of the baffle plates 40 is aligned with and facing a corresponding ridge 55 formed in the first major surface 47 of an adjacent one of the baffle plates 40. Furthermore, it should be understood that each of the first major surfaces 47 and the second major surfaces 48 of each of the baffle plates 40 are arranged in parallel to each other at any point along a length of each of the baffle plates 40 extending from the leading edge 41 to the trailing edge 42 thereof. The uniformity and alignment of each of the baffle plates 40 causes the array of baffle plates 40 to have a nested configuration, meaning that the ridges 55 formed in the first major surface 47 of each of the baffle plates 40 should correspond to and fit within the grooves 56 formed in the second major surface 48 of each of the baffle plates 40.

As shown in FIGS. 2 and 3, the alignment of the array of baffle plates 40 causes a plurality of flow channels 80 to be formed between the first major surface 47 and the second major surface 48 of adjacent ones of the baffles plates 40. The alignment of the ridges 55 and grooves 56 of all of the baffle plates 40 forming the array also causes each of the plurality of flow channels 80 to have a serpentine or sinusoidal shape. The uniformity and alignment of the contours formed in each of the baffle plates 40 also causes a distance between adjacent baffle plates 40 in a direction transverse to the direction of air flow therethrough to be equal along a length of each flow channel 80.

A distance between adjacent ones of the baffle plates 40 may be equal for each baffle plate 40 forming the array, but it should be understood that variable spacing between each of the baffle plates 40 may also be used, as desired. As shown in FIG. 2, the baffles plates 40 may be spaced such that there is no line of sight through flow channels 80 formed between adjacent ones of the baffle plates 40. In some embodiments, each of the crests 62 formed on the first major surface 47 of a first baffle plate 40 and the second major surface 48 of a second adjacent baffle plate 40 may be aligned in a direction running from the leading edge 41 to the trailing edge 42 of each baffle plate 40. In other embodiments, the baffle plates 40 may be spaced closer to each other, causing the flow channels 80 formed therebetween to have a more tortuous path. Still, in other embodiments, the baffle plates 40 may be spaced apart such that there is a line of sight through the flow channels 80.

The baffle plates 40 forming the condensation separator 30 may be formed from any material capable of withstanding any pressures or temperatures that may be encountered within the outlet tank 20. The baffle plates 40 may also be formed from a material that has a smooth finish, preventing the baffle plates 40 from causing an excessive pressure drop in a fluid flowing over the baffle plates 40. The baffle plates 40 may be formed from the same material used to form the outlet tank 20, including plastic. In some embodiments, the baffle plates 40 may be formed integrally with the outlet tank 20 during a single manufacturing process.

Referring now to FIG. 4, each of the first major surface 47 and the second major surface 48 of each of the baffle plates 40 may be covered with a surface feature 100. The surface feature 100 may be formed from any material capable of capturing, transporting, storing, or vaporizing the condensation formed within the charge air cooler 5.

Figure 5A:
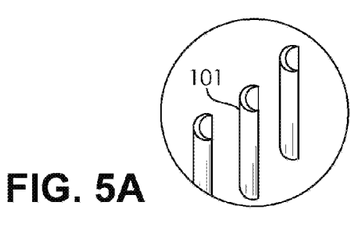
FIG. 5A is an enlarged fragmentary view of the surface feature illustrated in circle 5A of FIG. 4.
Figure 5B:
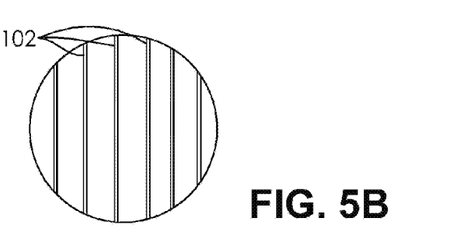
FIG. 5B is an enlarged fragmentary view of the surface feature illustrated in FIG. 5A according to another embodiment of the invention.
Figure 5C:
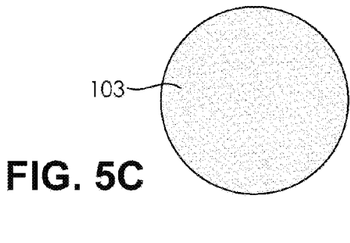
FIG. 5C is an enlarged fragmentary view of the surface feature illustrated in FIG. 5A according to another embodiment of the invention.
Figure 5D:
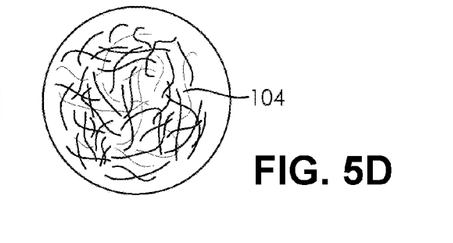
FIG. 5D is an enlarged fragmentary view of the surface feature illustrated in FIG. 5A according to another embodiment of the invention.

As shown in FIG. 5A, the surface feature 100 may be a contoured trap 101. The contoured trap 101 may be a projection extending from one of the first major surface 47 and the second major surface 48. The contoured trap 101 may be an arcuate projection curling in a direction toward the leading edge 41 of the baffle plate 40. However, it should be understood that any suitable shape of the contoured trap 101 may be used, including an L-shaped projection, or irregular shape, for instance. As shown in FIG. 5B, the surface feature 100 may be a plurality of indentations 102 extending parallel to the corrugations 50 and extending from the first edge 43 to the second edge 44 of each of the baffle plates 40. As shown in FIG. 5C, the surface feature 100 may be a coating or surface treatment 103 used to absorb liquid water condensation that encounters the surface treatment 103. The surface treatment 103 may, for instance, be an absorbent hydrophilic coating. The surface treatment 103 may be comprised of a porous material capable of retaining the liquid water therein. Referring now to FIG. 5D, the surface feature 100 may be an applied fiber 104. Similar to the surface treatment 103, the applied fiber 104 may be formed from a hydrophilic material capable of absorbing liquid water condensation.

In some embodiments, the surface feature 100 may only be applied to the trailing slopes 58 formed on each of the first major surface 47 and the second major surface 48 of each of the baffle plates 40. The surface feature 100 may preferably be disposed only on the trailing slopes 58 to prevent the surface feature 100 from adversely affecting the pressure or flow rate of air flowing through the flow channels 80 and toward the fluid outlet 23.

In use, the turbocharger compresses the air flowing therethrough, causing a temperature of the air to be increased. The warm air flows from the turbocharger and into the hollow interior 17 of the inlet tank 16 via the fluid inlet 18. The warm air is then distributed to the plurality of heat exchanger tubes 8 forming the heat exchanger core 10 via the plurality of passages formed in the first end plate 11 of the heat exchanger core 10. The warm air flowing through the plurality of heat exchanger tubes 8 exchanges heat with the second cooling fluid flowing between the heat exchanger tubes 8 to cool the warm compressed air originating from the turbocharger. As the air inside the plurality of heat exchanger tubes 8 is cooled, water vapor within the air may be caused to condense into liquid water.

A portion of the liquid water formed within the heat exchanger core 10 may propagate out of the heat exchanger core 10 and into the hollow interior 21 of the outlet tank 20 during operation of the vehicle while another portion of the liquid water may remain within the heat exchanger core 10 throughout operation of the vehicle and after operation has ceased. The portion of the liquid water remaining in the heat exchanger core 10 during inactivity of the vehicle or low airflow demand during operational conditions may be particularly problematic, as a subsequent opening of a vehicle throttle may cause a sudden increase in air flow rate through the charge air cooler 5 that causes the portion of liquid water in the heat exchanger core 10 to surge forward. A quantity of the liquid water surging forward may be larger than that during normal operation of the vehicle, as the liquid water may form a large "slug" or "spike" of water, which may include larger droplets of the liquid water. In either case, the liquid water flows through the hollow interior 21 of the outlet tank 20 and toward the fluid outlet 23 thereof.

The condensation separator 30 disposed within the hollow interior 21 of the outlet tank 20 causes both the air and the liquid water originating from the heat exchanger core 10 to flow through the plurality of flow channels 80 formed between adjacent ones of the baffle plates 40 before exiting the outlet tank 20. The tortuous path formed by the alternating pattern of ridges 55 and grooves 56 causes the liquid water flowing through each of the flow channels 80 to come into contact with one of the baffle plates 40 cooperating to form each of the flow channels 80. As should be understood, the liquid water will typically strike the baffle plates 40 along one of the leading slopes 57 facing opposite the direction of air and water flow through the flow channels 80. As described hereinabove, the leading slopes 57 of each baffle plate 40 may not have any surface feature 100 disposed thereon to prevent the surface feature 100 from adversely affecting the flow rate or pressure of the air flowing through each flow channel 80. Accordingly, the water encountering the leading slopes 57 may propagate along the leading slopes 57 toward an adjacent trailing slope 58 having the surface feature 100 disposed thereon.

The various different forms of the surface feature 100 all aid in retaining the liquid water within the condensation separator 30 so that a large quantity of the water does not enter the intake region of the engine in a short period of time. In the case of the contoured traps 101, the water is retained by the projections extending from the baffle plates 40. In the case of the plurality of indentations 102, the water is retained within the indentations 102. In the case of a surface treatment 103 or the applied fiber 104, the materials forming the surface treatment 103 or the applied fiber 104 are adapted to absorb or wick the liquid water from the air stream before retaining the water therein, due to the hydrophilic properties of the materials.

In all cases, the retention of the liquid water, even if temporary, militates against the problems caused by a large quantity of the water entering the intake of the engine in a short period of time. The surface feature 100 may also be advantageous as it may allow the liquid water to be slowly evaporated back into the air flowing through the flow channels 80. The re-vaporization of the liquid water from the surface feature 100 may improve engine efficiency by further cooling the air flowing through the flow channels 80 and the added water vapor may also improve power.

Figure 6:
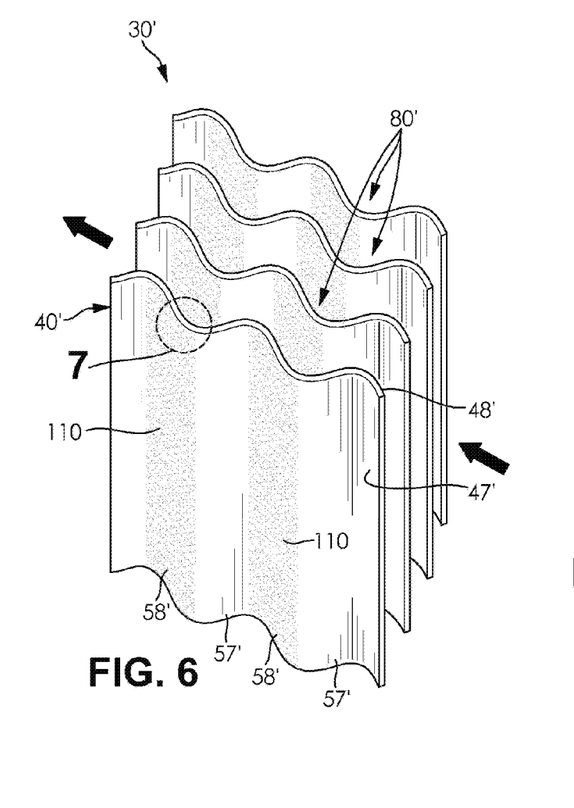
FIG. 6 is a perspective view of an array of baffle plates forming a condensation separator according to another embodiment of the invention.
Figure 7:
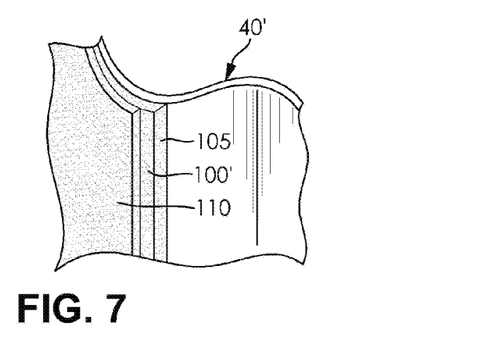
FIG. 7 is an enlarged fragmentary view of a portion of the condensation separator illustrated in circle 7 of FIG. 6.

FIGS. 6 and 7 illustrate a condensation separator 30' according to another embodiment of the invention. Structure similar to that illustrated in FIGS. 1-5 includes the same reference numeral and a prime (') symbol for clarity. The condensation separator 30' is similar to the condensation separator 30 except for the addition of a barrier layer 110. The barrier layer 110 may be applied on an exterior surface of any of the surface features 100' formed or applied to the baffle plates 40', but it may preferably be applied over a layer of one of the surface treatment 103 and the applied fiber 104. The barrier layer 110 may be comprised of a moisture resistant or hydrophobic material that does not absorb the liquid water as it encounters the barrier layer 110. Because the surface features 100' may preferably be applied only to the trailing slopes 58' of the baffle plates 40', the barrier layer 110 may accordingly only be applied to the trailing slopes 58' of the baffle plates 40' having the surface features 100'. The barrier layer 110 may be applied to a layer of the surface feature 100' material such that a leading edge 105 of the surface feature 100' layer may be exposed while a trailing edge of the surface feature 100' layer may be covered by the barrier layer 110 to allow the barrier layer 110 to transition to one of the major surfaces 47', 48' of the corresponding baffle plate 40'.

In use, the liquid water that flows through the flow channels 80' may first encounter the leading slopes 57' of each of the baffle plates 40' or strike the leading edge 105 of the surface feature 100' layer, as shown in FIG. 7. The liquid water that strikes the leading slopes 57' may then propagate toward the surface features 100' due to the force applied by air flowing through the flow channels 80' until the liquid water encounters the leading edge 105 of the surface feature 100' layer. In the case of the water absorbent surface treatment 103 or the applied fiber 104, the liquid water is absorbed into the surface features 100' where it can remain until it is drained away or reabsorbed by the air flowing through the flow channels 80'.

The barrier layer 110 prevents the liquid water absorbed into the layer formed by the surface features 100' from escaping the surface features 100' and propagating into the intake region of the engine suddenly. This allows the condensation separator 30' to be configured to drain the liquid water via gravity to a drainage mechanism (not shown) or drain conduit (not shown) that may be formed in the outlet tank 20', where the liquid water can be collected, exhausted, or reintroduced into the air stream. The barrier layer 110 being applied over the surface feature 100' layer may advantageously prevent an excessive pressure drop or reduction in flow rate through the flow channels 80' as the barrier layer 110 applies less drag to the air flowing therethrough than does a porous or fibrous surface feature 100' being exposed in its entirety along the trailing slopes 58' of the baffle plates 40'.

As described hereinabove, either of the condensation separator 30 and the condensation separator 30' may be disposed anywhere within the outlet tank 21 so long as the liquid water flowing therethrough must first flow through the plurality of flow channels 80, 80' formed in each condensation separator 30, 30' before exiting the outlet tank 21 via the fluid outlet 23. Accordingly, either condensation separator 30, 30' may be disposed immediately adjacent the fluid outlet 23, within the outlet conduit 24, or adjacent the fluid inlet 22. The condensation separators 30, 30' may be formed integrally with the remainder of the outlet tank 20 in a single manufacturing process or the condensation separators 30, 30' may be securely coupled into position within the outlet tank 20 by any known coupling means. If either of the condensation separators 30, 30' are integrally formed with the outlet tank 20 or securely coupled thereto, the wall 25 of the outlet tank 20 may be contoured to match the contours of the baffle plates 40, 40' to not allow for liquid water to bypass the outer edges of the condensation separators 30, 30'.

Figure 8:
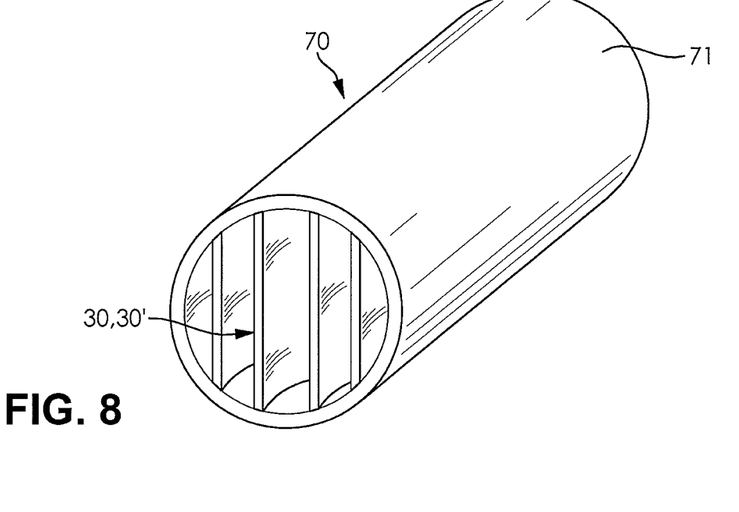
FIG. 8 is a perspective view of the condensation separator of FIGS. 1-7 formed as a part of an insert to be disposed within an outlet tank of a charge air cooler.

Alternatively, as shown in FIG. 8, either of the condensation separators 30, 30' may be formed as a part of an insert 70. The insert 70 may be a sleeve-like structure having an outer casing 71 shaped to surround either of the condensation separators 30, 30'. The outer casing 71 of the insert 70 is shown as being cylindrical, but it should be understood that the outer casing 71 may have any shape capable of being inserted and maintained within the outlet tank 20. For instance, the outer casing 71 of the insert 70 may have a shape and size allowing it to be inserted through the fluid outlet 23 and maintained within the outlet conduit 24. Use of the insert 70 may allow either of the condensation separators 30, 30' to be removed from the outlet tank 20 when desired, such as when routine maintenance must be performed on either of the condensation separators 30, 30'. The insert 70 may be formed integrally with either of the condensation separators 30, 30' during a single manufacturing process, or the insert 70 may be coupled to either of the condensation separators 30, 30' by any known coupling means.

Figure 9:
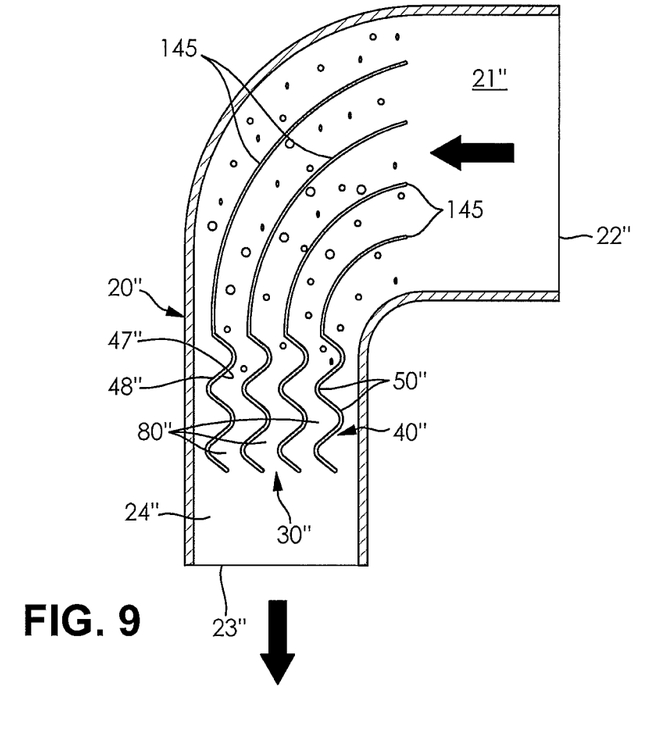
FIG. 9 is a cross-sectional plan view of an outlet tank having a condensation separator including a turn formed therein according to another embodiment of the invention.

Referring now to FIG. 9, a condensation separator 30" is shown according to a third embodiment of the invention. Structure similar to that illustrated in FIGS. 1-5 includes the same reference numeral and a double-prime (") symbol for clarity. The condensation separator 30" is similar to the condensation separator 30 and the condensation separator 30' except for the addition of a turn 145 formed in each of the baffle plates 40" forming the array.

The outlet tank 20" is shown as having an outlet conduit 24" and a fluid outlet 23" that directs air out of the outlet tank 20" in a direction perpendicular to the direction of air flow through the at least one fluid inlet 22". This causes the air to have to make a sudden turn of about 90° before exiting the outlet tank 20", which may result in turning losses that negatively affects the flow rate and pressure drop of the air entering the fluid outlet 23". The loss of flow rate and pressure may be particularly problematic when the air first strikes a wall defining the hollow interior 21" of the outlet tank 20" before reaching the outlet conduit 24" or the fluid outlet 23".

The array of baffle plates 40" may extend at least partially out of the outlet conduit 24" having the fluid outlet 23" and each of the baffle plates 40" may further include a turn 145. The turn 145 may cover any angle ranging from 0 degrees to 90 degrees. Although the turn 145 is shown as not having the corrugations 50", it should be understood that the baffle plates 40" may still include the corrugations 50" throughout the turn 145, except the shape of the corrugations 50" may vary as the baffle plates 40" extend around the turn 145. In either case, the plurality of flow channels 80" formed between adjacent ones of the baffle plates 40" may have a substantially constant cross-section extending around the turn 145, even when the corrugations 50" are present within the turn 145.

In use, the liquid water flows through the fluid inlet 22" of the outlet tank 20" and approaches the drain mechanism 30". The liquid water enters the array of baffle plates 40" in a direction running parallel to the baffle plates 40" adjacent the leading edges 41" thereof before bending around the turn 145 and exiting the array of baffle plates 40" at a different angle than the air entered the array of baffle plates 40". The turn 145 formed in the drain mechanism 30" may aid in turning the air stream more gradually to prevent an undesired loss of flow rate or pressure of the air stream. The turn 145 may also ensure that the liquid water traveling through the plurality of flow channels 80" first strikes one of the major surfaces 47", 48" of the baffle plates 40" before exiting the outlet tank 20", further ensuring that the liquid water is absorbed by one of the surface features 100".

From the foregoing description, one ordinarily skilled in the art can easily ascertain the essential characteristics of this invention and, without departing from the spirit and scope thereof, can make various changes and modifications to the invention to adapt it to various usages and conditions.

What is claimed is:

1. A condensation separator disposed within an outlet tank of a charge air cooler, the condensation separator comprising:
an array of baffle plates, wherein each of the baffle plates extends from a leading edge to a trailing edge in a first direction and the baffle plates are spaced apart from each other to form a plurality of flow channels, each of the flow channels formed between adjacent ones of the baffle plates; wherein each of the baffle plates includes at least one corrugation formed therein extending in a second direction transverse to the first direction; wherein at least a portion of each of the baffle plates is covered with a surface feature for trapping liquid water flowing through the plurality of flow channels, wherein the surface feature formed on at least a portion of each baffle plate is further covered with a barrier layer, the barrier layer configured to retain the liquid water in the surface feature.

2. The condensation separator according to claim 1, wherein the at least one corrugation formed in each of the baffle plates causes an alternating pattern of ridges and grooves to be formed in each of the baffle plates as the baffle plates extend in the first direction.

3. The condensation separator according to claim 2, wherein the ridges formed in one of the baffle plates are aligned with and facing the grooves formed in an adjacent baffle plate.

4. The condensation separator according to claim 2, wherein each of the ridges formed in a first baffle plate of the array of baffle plates includes a crest and each of the grooves formed in an adjacent second baffle plate of the array of baffle plates includes a nadir, wherein each of the crests of the first baffle plate are arranged parallel to and in alignment with a corresponding one of the nadirs of the second baffle plate.

5. The condensation separator according to claim 2, wherein each of the baffle plates includes an alternating pattern of leading slopes and trailing slopes; wherein each of the leading slopes extends in the first direction from a nadir of one groove to a crest of an adjacent ridge while each of the trailing slopes extends in the first direction from a crest of one ridge to the nadir of an adjacent groove.

6. The condensation separator according to claim 5, wherein the surface feature for trapping liquid water flowing through the plurality of flow channels is disposed only on the trailing slopes of each of the baffle plates.

7. The condensation separator according to claim 1, wherein the surface feature is at least one of a contoured trap, a plurality of indentations extending in the second direction formed in a surface of each of the baffle plates forming the at least one corrugation, and a hydrophilic material.

8. The condensation separator according to claim 1, wherein the array of baffle plates is disposed at least one of adjacent a fluid outlet formed in the outlet tank and within an outlet conduit formed in the outlet tank.

9. A charge air cooler for use with a turbocharged engine system of a motor vehicle, the charge air cooler comprising:
an outlet tank in fluid communication with a heat exchanger core; and an array of baffle plates disposed within the outlet tank, wherein the baffle plates are spaced apart from each other and each of the baffle plates includes an alternating pattern of ridges and grooves formed therein to form a plurality of tortuous flow channels between adjacent ones of the baffle plates; wherein at least a portion of each of the baffle plates is covered with a surface feature for trapping liquid water flowing through the plurality of flow channels, wherein the surface feature formed on at least a portion of each of the baffle plates is further covered with a barrier layer, the barrier layer configured to retain the liquid water within the surface feature.

10. The charge air cooler according to claim 9, wherein the array of baffle plates is formed integrally with the outlet tank.

11. The charge air cooler according to claim 9, wherein the array of baffle plates is disposed within an insert disposed within the outlet tank.

12. The charge air cooler according to claim 9, wherein each of the baffle plates includes an alternating pattern of leading slopes and trailing slopes; wherein each of the leading slopes extends in a first direction from a nadir of one groove to a crest of an adjacent ridge while each of the trailing slopes extends in the first direction from a crest of one ridge to the nadir of an adjacent groove.

13. The charge air cooler according to claim 12, wherein the surface feature is disposed only on the trailing slopes formed on each of the baffle plates.

14. The charge air cooler according to claim 13, wherein the surface feature is a hydrophilic material used to absorb the liquid water flowing through the flow channels.

15. The charge air cooler according to claim 13, wherein the barrier layer is disposed only on the trailing slopes formed on each of the baffle plates.

16. The charge air cooler according to claim 15, wherein the barrier layer is formed of a hydrophobic material and captures the liquid water within the surface feature disposed between the barrier layer and the baffle plate.

17. A charge air cooler for use with a turbocharged engine system of a motor vehicle, the charge air cooler comprising:
  an outlet tank in fluid communication with a heat exchanger core;
  a plurality of baffle plates disposed within the outlet tank, wherein a plurality of flow channels are formed between adjacent ones of the baffle plates;
  a surface feature disposed on at least a portion of the plurality of baffle plates, the surface feature adapted to capture liquid water flowing through the plurality of flow channels; and
  a barrier layer disposed over at least a portion of the surface feature, the barrier layer adapted to retain the liquid water within the surface feature.

18. The charge air cooler of claim 17, wherein the surface feature is formed from a hydrophilic material and the barrier layer is formed from a hydrophobic material.

* * * * *